Figure 3A:
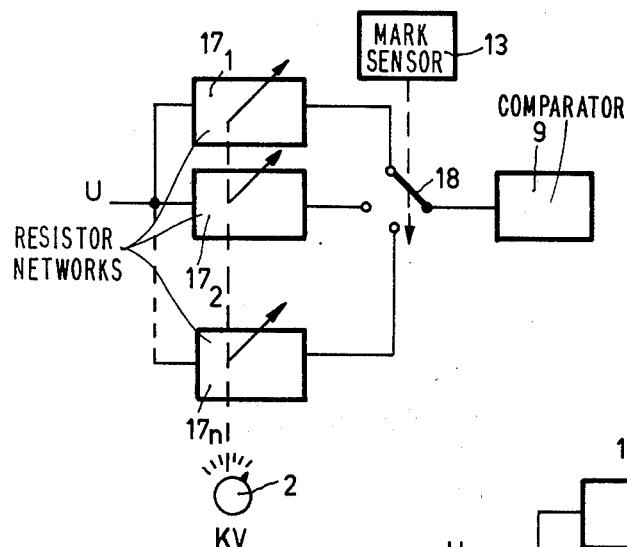

United States Patent [19]

Richter

[11] 4,121,104

[45] Oct. 17, 1978

[54] X-RAY EXAMINING DEVICE WITH AUTOMATIC TIMER AND FILM CONTAINER FOR AN X-RAY EXAMINING DEVICE

[75] Inventor: Detlev Richter, Norderstedt, Fed. Rep. of Germany

[73] Assignee: U.S. Philips Corporation, New York, N.Y.

[21] Appl. No.: 751,473

[22] Filed: Dec. 16, 1976

[30] Foreign Application Priority Data

Dec. 17, 1975 [DE] Fed. Rep. of Germany ....... 2556699

[51] Int. Cl.² .................................................. G01J 1/42
[52] U.S. Cl. ..................................... 250/355; 250/402; 250/476
[58] Field of Search ............... 250/354, 355, 402, 413, 250/468, 476, 337, 328

[56] References Cited

U.S. PATENT DOCUMENTS

| | | | |
|---|---|---|---|
| 2,829,273 | 4/1958 | Fransen | 250/413 X |
| 3,604,935 | 9/1971 | Nather | 250/328 |
| 3,725,659 | 4/1973 | Culley | 250/337 |
| 3,805,071 | 4/1974 | Frank | 250/328 |
| 3,809,901 | 5/1974 | Szalanczy et al. | 250/337 |
| 3,942,016 | 3/1976 | Schatz | 250/476 X |
| 4,032,784 | 6/1977 | Rich | 250/355 |

Primary Examiner—Davis L. Willis
Attorney, Agent, or Firm—Frank R. Trifari; Jack E. Haken

[57] ABSTRACT

X-ray examination apparatus includes means for terminating an exposure at a dose determined, in part, by the value of the tube voltage and the characteristics of the intensifying screen in use. Means are provided to read screen-identifying markings on film cassettes and to adjust the turn-off dose level in response thereto.

10 Claims, 9 Drawing Figures

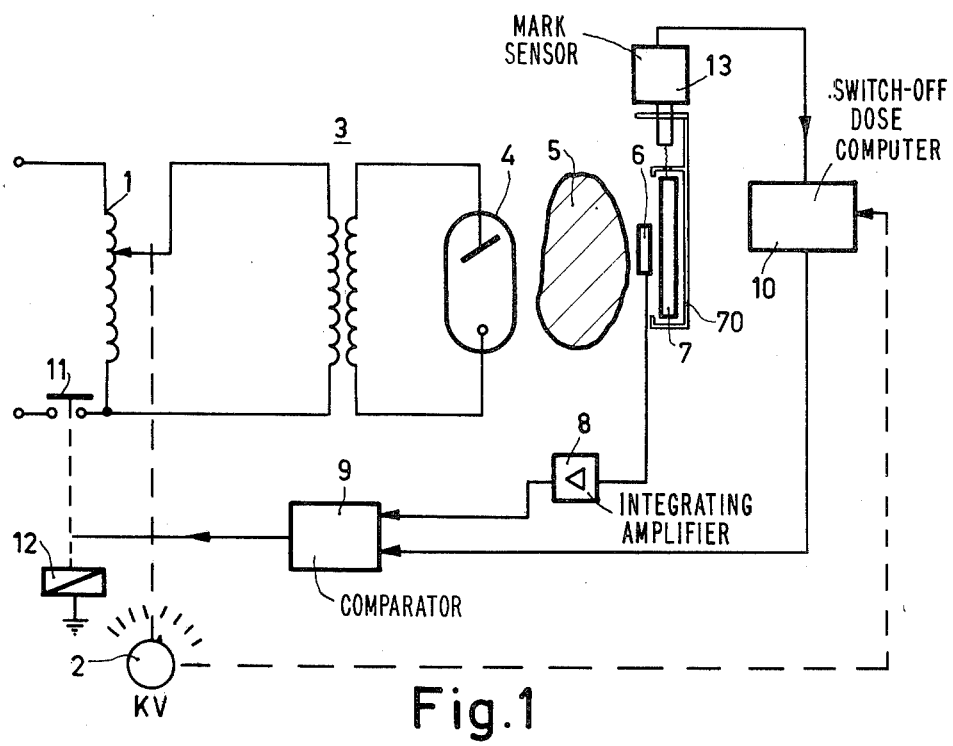
Fig.1
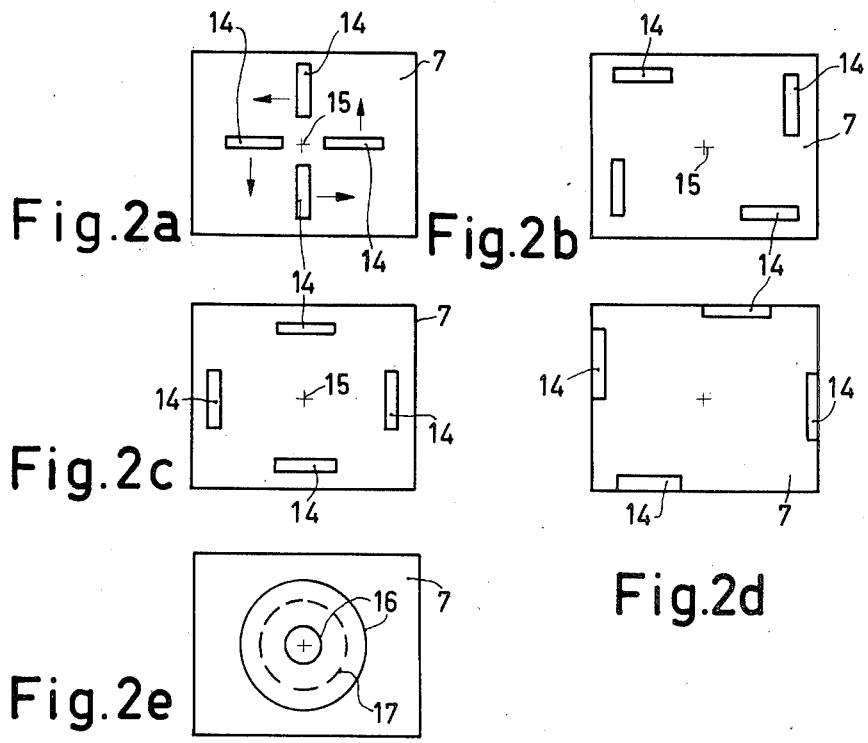
Fig.2a   Fig.2b
Fig.2c   Fig.2d
Fig.2e

X-RAY EXAMINING DEVICE WITH AUTOMATIC TIMER AND FILM CONTAINER FOR AN X-RAY EXAMINING DEVICE

The invention relates to an X-ray examining device which includes an X-ray source, a film container support for accommodating a film container with intensifying screens and an automatic timer which comprises a measuring device for determining a measuring signal which corresponds to a radiation dose to be measured, a switch-off signal generator for generating a switch-off signal which corresponds to a present radiation dose, and a comparator and switch-off device for switching off in X-ray source when the measuring and switch-off dose are in agreement.

Furthermore, the invention relates to a film container for such an X-ray examining device.

X-ray examining devices are known from German Patent Specification No. 2,154,539. A screening stand or a bucky device may be used as film container support. The film container may, for example, be a cassette which is filled with film in the dark room.

The degree of blackening of the film not only depends on the dose which is fed to the intensifying screens but also on the hardness (quality) of the radiation. Consequently the dose (switch-off dose) which is controlled via a measuring device to obtain a given blackening of the film also depends on the adjusted high voltage which determines the hardness of the radiation. For that reason, known X-ray examining devices are provided with a resistor network which can be changed by means of the voltage selector and consequently changes the switch-off dose signal.

In these prior art X-ray examining devices only one type of intensifying screen can generally be used. In principle it is also possible to use intensifying screens which only differ from one another as regards dose sensitivity, do not differ in sensitivity to the hardness of the radiation which depends on the high voltage. It is then possible to select on the control panel a decreased blackening when using the intensifying screen of a higher dose sensitivity. However, this demands extra attention from the user. Various types of intensifying screens which do not only deviate from one another as regards sensitivity but also as regards the dependency of the switch-off dose on the high voltage cannot be used side by side in such an X-ray device. In practice, therefore, only one single type of intensifying screen is used in combination with such an X-ray examining device.

It is an object of the invention to provide an X-ray examining device in which the various types of intensifying screens can be used side by side, no extra attention being demanded from the user.

In an X-ray examining device according to the invention the film container support is provided with a mark sensor for sensing a mark on a film container to be accommodated in the film container support. An output of this mark sensor is connected to an input of the switch-off signal generator, so that the output signal of the mark sensor determines a switch-off dose signal which is tuned to a preset high voltage and matched to the intensifying screens.

In an embodiment of an X-ray examining device according to the invention the switch-off dose generator comprises a separate resistor network for each intensifying screen to be used which can be adjusted by means of a voltage selector and which selects a switch-off dose signal which is determined by the output signal of the mark sensor. Such a switch-off dose generator is not intricate and can always be modified by simple means to new types of intensifying screens.

If film containers of the same size are used for all photographs and if these film containers are always placed in the same orientation in the film container support no difficulties will occur. However, if film containers of a different size are placed in the film container support, (for example cassettes for 13 × 18, 18 × 24, 24 × 30 or 30 × 40 cm films) and if these cassettes are placed in different orientations in the film container support (lengthwise or widthwise) then the problem arises how to place the marks in such a way that they can be sensed by the mark sensor, independent of the size of/the film container and independent of the position of the relevant film container in the film container support (lengthwise or widthwise). According to the invention the film container is provided with four identical marks which are applied, two by two symmetrically with respect to the center of the film container. The position of the marks depends on which part of the film container is always in the same place, independent of the film size.

If, for example, the film container is always centered in the film container support (for example in the case of a photomask with a bucky device) then the four marks must all be at the same distance from the centre of the film container. If only two adjacent sides of the film container are in a defined position in the film container support (for example the lower and the right hand sides) so that always a corner of the film container is in a defined position, then the four marks must be applied at a same distance from the nearest corner. If the cassette in the film container support is centered heightwise (see German Auslegeschrift No. 1522179) then it is recommended that the marks be applied at a same distance from the center lines of the film container. If the film container is positioned in the film container support so that its center is always in the same place, it is of advantage if the marks are concentric rings with respect to the center of the film container; the mark sensor must then be placed in the film container support so that its read heads for reading the various mark symbols are in the radial direction. If, an edge of the film container which extends into the insertion direction or the central line of the film container is always pushed along the same place in the film container support, independent of the size, it is advantageously to apply the marks on four edges of the film container. The result is that the marks can be read while inserting the film container and not only when the film container assumes a defined position, for example the recording position with a Bucky device or the parking position with a screening stand.

The invention will now be further explained with reference to a drawing, in which FIG. 1 shows an embodiment of an X-ray examining device according to the invention, FIG. 2a to FIG. 2e show various positions of the marks on the film container, and FIGS. 3a to 3c each represent a block diagram of various embodiments of the switch-off dose generator.

The X-ray examining device according to FIG. 1 comprises an autotransformer 1 which is used as a setting transformer and which is connected via a switching contact 11 to the supply voltage and whose tap is adjustable by means of voltage selector 2. The tapped secondary voltage is supplied to the primary winding of a high voltage transformer 3. An X-ray tube is connected into the secondary circuit of the high voltage transformer 3. The high voltage rectifiers which are included as a rule in the secondary circuit and the means for adjusting the X-ray tube current have been omitted for simplicity. The X-ray radiation emitted by the X-ray tube 4 passes through a body 5, behind which a device 6 for measuring the radiation dose is disposed. Behind the measuring device 6 there is the film container 7, for example a film cassette provided with an intensifying screen. The film container 7 is placed in a film container support 70. The signal of the measuring device 6 is supplied to a first input of a comparison stage 9 via an amplifier 8 which integrates the signal to generate a signal which is proportional to the dose. A switch-off dose signal which is produced by a switch-off dose computer 10 and which corresponds to the required switch-off dose is supplied to the other input of the comparator stage 9. If the signal which corresponds to the measured dose reaches the value of the switch-off dose signal contact 11 of the relay 12 in the primary circuit of the high voltage transformer, which is controlled by the comparator stage 9 is opened, and the X-ray examination is terminated. Up to this point the X-ray examining device described is equivalent is to prior art X-ray examining devices.

According to the invention the film container 7, for example a film cassette, is provided with marks, not shown in FIG. 1, which are detected by a sensor 13. Sensor 13 generates an output signal which depends on the marks. The marks may consist of mechanical, optical, electrical or magnetic symbols, it being advantageous to use a binary code so that a marking symbol is constituted by the presence or the absence of an optical, mechanical, electrical or magnetic mark. The output signal of the marking sensor 13 controls, in cooperation with the adjusted high voltage (for example, — as indicated by the dashed line — via the voltage selector 2), the switch-off dose computer so that the switch-off dose signal produced by the switch-off dose computer 10 corresponds to the type of intensifying screen which is characterized by the marking and to the switch-off dose required at the adjusted high voltage. Details of this operation are described hereebelow with reference to FIGS. 3a to 3c inclusive.

Figure 3B:
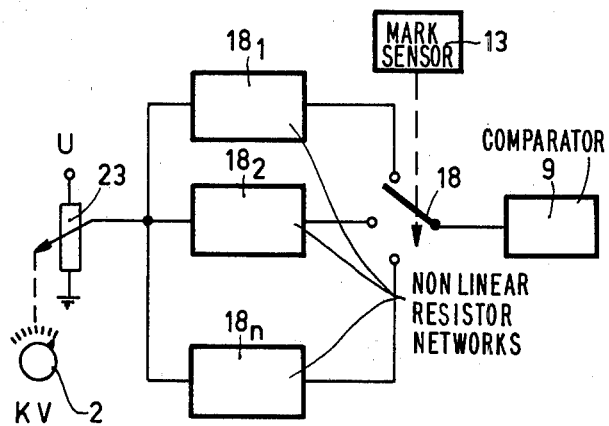
Figure 3C:
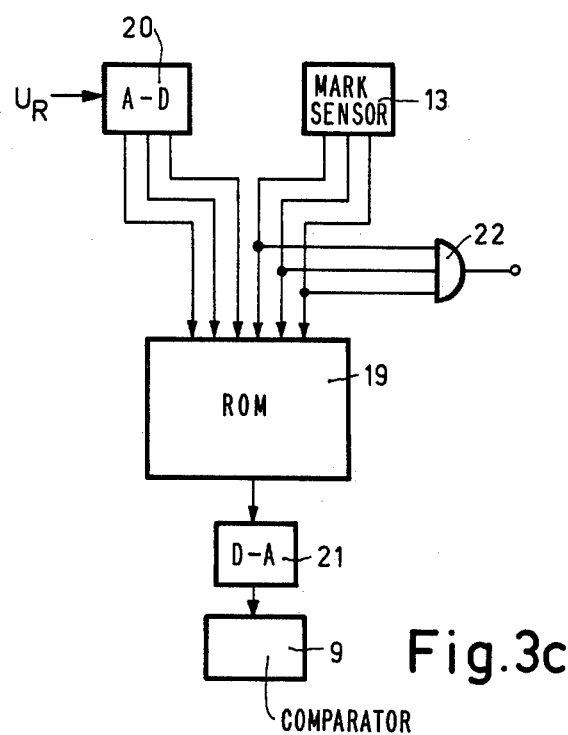

FIGS. 3a to 3c inclusive show various embodiments of the switch-off dose computer 10. The switch-off dose computer of FIG. 3a comprises a plurality of resistor networks $17_1 \ldots 17_n$ which are shown in the form of blocks and which are each associated with a given type of intensifying screen. These resistor networks $17_1 \ldots 17_n$ are fed by a common voltage U. They are coupled to the axis of the voltage selector 2 such that they are changed when the high voltage is changed. The outputs of the resistor networks $17_1 \ldots 17_n$ are connected via a contact 18 of a relay selector of the mark sensor 13 to one input of the comparator circuit 9 so the signal supplied to the comparator circuit 9 depends on both the voltage setting and on one of the resistor networks $17_1 \ldots 17_n$ which is switched-on by the mark sensor 13 via the contact 18. The switch-off dose thus depends on the high voltage and on the type of intensifying screen.

Another embodiment of a switch-off dose computer suitable for an X-ray examining device according to the invention is shown in FIG. 3b. This embodiment comprises a plurality of non-linear resistor networks $18_1$, $18_2 \ldots 18_n$ (one for each type of intensifying screen) whose inputs are connected in parallel and fed by one voltage which is proportional to the pre-set high voltage. To that end the inputs may, for example, be coupled to the tap of a potentiometer 23, which — as shown in the drawing — is adjustable by means of the voltage selector 2. The output voltage of the non-linear networks $18_1 \ldots 18_n$ depends on the input voltage in the same manner as the switch-off dose for a given blackening of the associated type of intensifying screen is related to the high voltage. The outputs of the non-linear networks $18_1 \ldots 18_n$ are connected via an electronic contact 18, which is controlled by the mark sensor 13 to one input of the comparator circuit 9. Because the position of the contact 18 depends on the output signal of the mark sensor 13, that is to say on the marking or on the type of intensifying screen respectively, the switch-off dose signal required for the preset high voltage and the type of intensifying screen used is thus provided to the input of the comparator circuit 9.

A further embodiment of the switch-off dose generator suitable for the invention is shown in FIG. 3c. The switch-off dose generator comprises a read only memory 19 (ROM), which comprises a group of memory locations for each type of intensifying screen. Each group of memory locations comprises the switch-off dose required for various high voltage values with the relevant intensifying screen. If a binary signal is assigned, for example by means of an analog-to-digital convertor 20, to the various high voltage values for which the associated switch-off doses are stored in the read-only memory 19 then it is possible to form, as shown in FIG. 3c from the output signal of the mark sensor 13 and the binary signal which represents the high voltage, the address of that memory location wherein the switch-off dose is stored which is required for the type of intensifying screen and the preset high voltage which are used. The content of the memory location addressed in this manner is then available at the output of the read-only memory 19 and is supplied via a digital-to-analog convertor 21 to one input of a comparator circuit 9.

In principle, the output signal of the mark sensor 13 can also be used to operate a blocking device which prevents an examination from being carried out when no film cassette is present. Namely, in the case a cassette is absent the mark sensor detects a binary signal whose marking symbols are all the same, so either "000" or "111". This marking signal can — as shown in FIG. 3c — be fed to an OR-gate 22 which controls the blocking device, not further shown.

In FIG. 1 the sensor 13 is placed in such a position that it can detect marks which have been applied to the outer edge (which is perpendicular to the plane of the film). However, this arrangement is only recommended if either cassettes of the same size are used or if the cassettes are introduced and positioned in the film container support in such a way that, with large and with small cassettes, one edge is always situated in the same place of the film container support and at the same distance from the mark sensor (which is fixed in the film container support). However, this is frequently not the case.

When a Bucky device is used as film container support the cassette is, for example, always so positioned that the center of the film sheet present therein and consequently the center of the cassette is oriented in a straight line, the central line, which is perpendicular with respect to the plane of the film and passes through the focus of the X-ray radiator. In this case the position of the cassette edges with respect to the film container support depends on the size of the cassette.

FIG. 2a shows an arrangement of the fields which is suitable for this case, each field being provided with the marks which characterize the type of intensifying screen. Herein, at a side of the cassette 7 which is parallel with respect to the plane of the film four marking fields 14 have been applied, two of which are each time placed symmetrically with respect to the center 15, the distances from the four marks to the center being equal — for large cassettes as well as for small cassettes — and wherein the marks have been placed such that, when rotated 90° around the center the marks are in the same place as the adjacent marks in the previous situation.

If in the film container support the mark sensor 13 is placed such that it occupies the same position with respect to the central line as one of the marking fields 14 with respect to the centre 15, then each time one of the marks is invariably detected by the mark sensor independent of how (in the length or in the width) the cassette is placed in the film container support. If the same side of the cassette does not always face the X-ray radiator, both sides must be provided with corresponding marks.

As indicated by means of the arrows in FIG. 2a, all of the marks may also be displaced, with respect to the central line and/or occupy the same oblique angle with respect to the central line of the cassette.

FIG. 2b shows an arrangement of the marking fields 14 on the cassette 7 which is suitable for a film container support, wherein, instead of the center an edge of the cassette always in the same place of the film carrier support (depending on the size of the cassette). In this case two marking fields are placed symmetrically with respect to the center 15. All four marking fields are at the same distance from the adjacent edge and are at the same angle (in FIG. 2b: parallel) to the adjacent edge.

An arrangement of the marking field which is suitable for a film container support wherein a border of the cassette and the center line which is perpendicular thereto arive in the same position, independent of the cassette size, (see, for example, German Auslegeschrift No. 1522179) is shown in FIG. 2c. Also here two marking fields have been positioned symmetrically with respect to a cassette center-line (or a defined distance thereof) and at a defined distance from the border. If this distance is the same for all cassette sizes then the marking of a cassette can be determined with one single mark sensor independent of the position which it occupies in the film carrier support and independent of the size thereof.

FIG. 2d shows an elevational view of a film cassette in which four marking fields are placed at the cassette borders. The marking fields have not been applied symmetrically with respect to the center. Cassettes having marking fields of such an arrangement can be used in a film container support, wherein a cassette border which is parallel with respect to the direction of insertion of the cassette in the film container support is invariably passed along the same place of the film carrier support when being inserted; independent of the size of the cassette. If the mark center is arranged in this place, then the marking which characterizes the type of intensifying screen can already be read when the cassette is inserted. The mark sensor only needs one read head for reading one single marking symbol, when the marking field extends parallel with respect to the cassette border, because on insertion the marking symbols can be read successively.

If instead of the cassette border the cassette central line, which is parallel with respect to the direction of insertion is in the same place on film container support when the cassette is inserted into the support, for large and small cassette sizes as is, for example, the case with the screening stand according to the German Auslegeschrift No. 1522179 then the marking fields must be placed on the center line as indicated in FIG. 2a or FIG. 2c or at a constant given, distance thereform.

FIG. 2e shows a cassette 7 which is provided with circular marking symbols which are concentric with respect to the central point. Herein the presence of a ring 16 can be given a logic "1" and the absence of the ring in a given place (in FIG. 2e this is indicated by the dashed circle 17) a logic "0". Thus, the mark "101" has been assigned to the cassette 7 or to the type of intensifying screen used therein which, with a film container support with automatic centering of the cassette, for example a Bucky device, can be recognized by means of a mark sensor whose read heads are placed in the recording direction at distances from the apex of the central line which correspond to the radii of the marking circles 16 and 17.

What is claimed is:

1. In an X-ray examining device having an X-ray source, a film container support for receiving a film container with intensifying screens and an automatic timer which comprises
    a measuring device for determining a measuring signal which corresponds to a radiation dose to be measured,
    a switch-off signal computer for generating a switch-off dose signal which corresponds to a preset radiation dose,
    and a comparator and switch-off device for switching-off the X-ray source when the measuring and switch-off dose signal are in agreement; the improvement wherein:
    the film container support includes a mark sensor for sensing a mark on a film container to be accommodated into the film container support; and
    an output of the mark sensor is connected to an input of the switch-off signal computer to provide a switch-off dose signal which is tuned to a preset high voltage and matched to an intensifying screen in said film container.

2. A device as claimed in claim 1, wherein the switch-off signal computer comprises a read only memory which includes a group of memory locations for each type of intensifying screen wherein the switch-off dose required for the relevant type of intensifying screen for given high voltages is stored and which forms, from the output signal of the mark sensor and a digital signal which corresponds to the preset high voltage, the address of a memory location whose content determines the switch-off dose signal.

3. The device of claim 1 further including at least one film container having marks to indicate a type of intensifying screen therewithin.

4. A device as claimed in claim 3, wherein the marks are concentric rings disposed around the center of the container.

5. A device as claimed in claim 3 wherein the marks are disposed on four borders of the film container.

6. A device as claimed in claim 3 wherein said film container includes two pairs of identical marks, each of said pairs being symetrically disposed with respect to the center of said container.

7. A device as claimed in claim 3 wherein said film container includes four identical marks each of which is disposed at the same distance from the center of the container.

8. A device as claimed in claim 3 wherein said film container includes four identical marks, the distances from each of said marks to the nearest edge of the container being equal.

9. A device as claimed in claim 1 wherein the switch-off signal computer comprises
a separate, adjustable resistor network for each type of intensifying screen to be used, said networks being adjustable in response to a voltage selector, and
means for connecting one of said networks, in response to an output signal from said mark sensor, to calculate the value of said switch-off dose.

10. A device as claimed in claim 1 wherein an output signal from the mark sensor is connected to block X-ray examination when a film container is absent from the film container support.

* * * * *